US012667896B2

(12) United States Patent (10) Patent No.: US 12,667,896 B2
Chiang et al. (45) Date of Patent: Jun. 30, 2026

(54) SAWING MACHINE HAVING CHIP COLLECTION ASSEMBLY

(71) Applicant: REXON INDUSTRIAL CORPORATION LTD., Taichung City (TW)

(72) Inventors: Hung-Jung Chiang, Taichung City (TW); Wei-Lun Lu, Taichung City (TW)

(73) Assignee: REXON INDUSTRIAL CORPORATION LTD., Taichung City (TW)

( * ) Notice: Subject to any disclaimer, the term of this patent is extended or adjusted under 35 U.S.C. 154(b) by 116 days.

(21) Appl. No.: 18/648,768

(22) Filed: Apr. 29, 2024

(65) Prior Publication Data

US 2024/0367246 A1 Nov. 7, 2024

(30) Foreign Application Priority Data

May 5, 2023 (TW) .................................. 112116827

(51) Int. Cl.
B23D 59/00 (2006.01)
B23D 45/04 (2006.01)

(52) U.S. Cl.
CPC .......... B23D 59/006 (2013.01); B23D 45/048 (2013.01)

(58) Field of Classification Search
CPC .. B27G 5/02; B27G 3/00; B27G 19/04; Y10T 83/7734; Y10T 83/8773; Y10T 83/2066; Y10T 83/207; Y10T 83/7788; Y10T 83/7697; B23D 59/006; B23D 45/048; B27B 9/00; B23Q 11/0046; B23Q 11/0042
See application file for complete search history.

(56) References Cited

U.S. PATENT DOCUMENTS 3,249,134 A * 5/1966 Vogl ........................ B27G 19/02
144/251.1
3,525,183 A * 8/1970 Gargrave ................ B24B 55/06
451/453

(Continued)

FOREIGN PATENT DOCUMENTS

JP H07276302 A * 10/1995
TW M288235 3/2006

OTHER PUBLICATIONS

JP_H07276302_A (Year: 1995).*

*Primary Examiner* — Jonathan G Riley
(74) *Attorney, Agent, or Firm* — MUNCY, GEISSLER, OLDS & LOWE, P.C.

(57) ABSTRACT

A sawing machine includes a worktable on which a workpiece is fixed, a rocker arm pivotally connected with the worktable, and a saw blade rotatably mounted to the rocker arm. The rocker arm includes a chip collection tube. A workpiece position detecting member and a chip guiding member are movably connected with the rocker arm by a connecting rod set in a way that the workpiece position detecting member is moveable by the workpiece, and the chip guiding member is in communication with the chip collection tube and moveable along with the workpiece position detecting member to a position adjacent to a top surface of the workpiece. As such, the sawing machine effectively collects chips generated during the sawing process of the workpieces having different thicknesses.

3 Claims, 7 Drawing Sheets

(56)            References Cited

U.S. PATENT DOCUMENTS

| 3,913,437 | A | * | 10/1975 | Speer | B26D 7/22 |
| | | | | | 83/478 |
| 3,965,787 | A | * | 6/1976 | Plischke | B27G 19/02 |
| | | | | | 83/544 |
| 5,287,780 | A | * | 2/1994 | Metzger, Jr. | B23Q 5/585 |
| | | | | | 83/486.1 |
| 5,353,670 | A | * | 10/1994 | Metzger, Jr. | B27G 19/02 |
| | | | | | 83/486.1 |
| 5,918,522 | A | * | 7/1999 | Benedict | B27G 19/02 |
| | | | | | 83/486.1 |
| 5,927,171 | A | * | 7/1999 | Sasaki | B23D 59/006 |
| | | | | | 83/100 |
| 5,950,514 | A | * | 9/1999 | Benedict | B23D 45/042 |
| | | | | | 83/478 |
| 6,119,569 | A | * | 9/2000 | Benedict | B27G 19/02 |
| | | | | | 83/DIG. 1 |
| 6,510,772 | B2 | * | 1/2003 | Brickner, Jr. | B23D 59/006 |
| | | | | | 83/100 |
| 7,204,178 | B2 | * | 4/2007 | Bergmann | B23D 59/006 |
| | | | | | 83/100 |
| 8,161,858 | B2 | * | 4/2012 | Aoyama | B23D 45/048 |
| | | | | | 83/490 |
| 8,272,304 | B2 | * | 9/2012 | Lawlor | B23D 47/025 |
| | | | | | 83/100 |
| 8,393,939 | B2 | * | 3/2013 | Chianese | B24B 55/06 |
| | | | | | 451/456 |
| 8,522,656 | B2 | * | 9/2013 | Kani | B27B 5/29 |
| | | | | | 83/483 |
| 8,561,513 | B2 | * | 10/2013 | Ushiwata | B27B 5/29 |
| | | | | | 83/477.1 |
| 2009/0158906 | A1 | * | 6/2009 | Shibata | B27G 19/08 |
| | | | | | 83/477.2 |
| 2011/0219928 | A1 | * | 9/2011 | Chuang | B27G 19/02 |
| | | | | | 83/478 |
| 2014/0260848 | A1 | * | 9/2014 | Gantke | B23D 45/048 |
| | | | | | 83/100 |

* cited by examiner

SAWING MACHINE HAVING CHIP COLLECTION ASSEMBLY

BACKGROUND OF THE INVENTION

1. Field of the Invention

The present invention relates to a sawing machine and more particular, to a structural improvement of a sawing machine, which can effectively collect cutting chips generated during sawing process via a chip collection assembly when the sawing machines saws various workpieces having different thicknesses.

2. Description of the Related Art

Conventional sawing machines, such as miter saws, generate many cutting chips during the sawing operation of workpieces. In order to avoid chips accumulating inside the sawing machine or dispersing into the ambient environment to cause environmental pollution, in the convention sawing machines, a dust collection tube is generally designed to be arranged on a rocker arm, on which a saw blade is mounted. By means of the airflow generated during sawing, most chips are directed via the dust collection tube into a dust collection bag that is connected to the dust collection tube.

Taiwan Patent No. M288235 describes a sawing machine comprising a dust collection member and a rocker arm, to which a dust collection tube is mounted. The dust collection member is pivotally connected to the rocker arm 40 and in communication with the interior of the dust collection tube. By means of the dust collection member, chips can be effectively collected into a dust collection bag via the dust collection member and the dust collection tube.

Generally, the position of the dust collection member needs to be aimed at the upper edge of the workpiece. Due to the limitations of the cutting specifications of the sawing machine and to allow operators to use the sawing machine to cut thicker workpieces, the position of the dust collection member cannot be arranged too low. However, in this way, when operators need to use the sawing machine to cut thinner workpieces, the position where the chips are ejected may be lower, such that the cutting chips of thinner workpiece may be difficult to enter the dust collection tube via the dust collection member and finally be collected by the dust collection bag, resulting in ineffective chip collection.

To address the above problem, some sawing machines abandon the use of the dust collection member and instead add a mask made of soft rubber. However, under prolonged contact with the workpiece, the mask may be damaged, rendering it unable to achieve the intended dust collection effect. It can be seen that the design of existing sawing machines is not perfect and there is room for improvement.

SUMMARY OF THE INVENTION

The present invention has been accomplished in view of the above-noted circumstances. It is an objective of the present invention to provide a sawing machine, which can effectively collect cutting chips when sawing workpieces of different thicknesses.

To attain the above objective, the present application provides a sawing machine having the following technical features. Specifically, the sawing machine for sawing a workpiece comprises a base assembly, a sawing assembly and a chip collection assembly. The base assembly includes a worktable, a post connected with the worktable, and a sawing space defined between a top surface of the worktable and a front side of the post. The sawing assembly includes a rocker arm, a saw blade and a driving device. The rocker arm is pivotally connected with the base assembly and swingable towards the sawing space. The rocker arm includes a chip collection tube having an inlet and an outlet arranged in a way that the chip collection tube is in communication with the sawing space through the inlet and with an exterior of the sawing machine through the outlet. The saw blade is rotatably disposed with the rocker arm, and the driving device is disposed with the rocker arm to drive the saw blade to rotate. The chip collection assembly includes a workpiece position detecting member, a chip guiding member, and a connecting rod set. The workpiece position detecting member and the chip guiding member are movably connected with the rocker arm by the connecting rod set in a way that the workpiece position detecting member is moveable by of the workpiece, and the chip guiding member is in communication with the inlet of the chip collection tube and moveable along with a movement of the workpiece position detecting member to a position adjacent to a top surface of the workpiece.

With the structural design of the sawing machine described above, when an operator needs to saw a thicker workpiece using the sawing machine, the chip guiding member can be upwardly moved by the workpiece position detecting member to a position adjacent to the top surface of the thick workpiece, allowing the chips generated during sawing to smoothly enter the chip collection tube through the chip guiding member and finally be collected into a chip collection bag through the outlet of the chip collection tube. On the other hand, when an operator needs to saw a thinner workpiece using the sawing machine, the chip guiding member can be downwardly moved by the workpiece position detecting member to a position adjacent to the top surface of the thin workpiece, allowing the chips generated during sawing by the sawing machine to enter the chip collection tube through the chip guiding member and finally be collected into the chip collection bag.

In one aspect, the sawing machine may be, but is not limited to, a mitre saw.

In another aspect, the terms "chips" and "chip collection" in the present invention should be interpreted in a reasonable and broad manner, and the shapes of the chips may vary depending on the material of the workpiece. For example, if the workpiece is a tile, the generated "chips" may be powdery. If the workpiece is a wooden board, the generated "chips" may be lamellar.

In another aspect, the sawing machine can be used to saw workpieces of different thicknesses. When sawing a thicker workpiece, the chip guiding member upwardly moves relative to the base assembly to an upper position, referred to as a thick workpiece position, so that the chips can smoothly enter the chip collection tube through the chip guiding member located at the thick workpiece position. When sawing a thinner workpiece, the chip guiding member downwardly moves relative to the base assembly to a lower position, referred to as a thin workpiece position, so that the chips can smoothly enter the chip collection tube through the chip guiding member located at the thin workpiece position.

In another aspect, the rocker arm may further comprise a guide plate set including a plurality of guide plates spaced from each other. The guide plate set is in communication with the inlet of the chip collection tube, and the chip guiding member is in communication with the inlet of the chip collection tube through the guide plate set.

Specifically, the connecting rod set may comprise at least one first rod and a second rod. The workpiece position detecting member is pivotally connected at a top end thereof with the guide plate set by the at least one first rod. The guide plate set includes a vertical groove, and the chip guiding member includes an inclined groove and a protrusion block. The second rod is mounted to the workpiece position detecting member and located within the inclined groove of the chip guiding member, and the protrusion block is located within the vertical groove.

In another aspect, the workpiece position detecting member may have an arc-shaped bottom end, thereby facilitating detecting the position of the top surface of workpieces of different thicknesses.

Preferably, the arc-shaped bottom end may include a first segment and a second segment connected with the first segment. The first segment gradually extends upward from a rear toward a front thereof, and the second segment gradually extends downward from a rear toward a front thereof. The arc-shaped bottom end of the chip guiding member is adjacent to a junction between the first segment and the second segment, thereby allowing the chips to more smoothly enter the chip collection tube through the chip guiding member.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
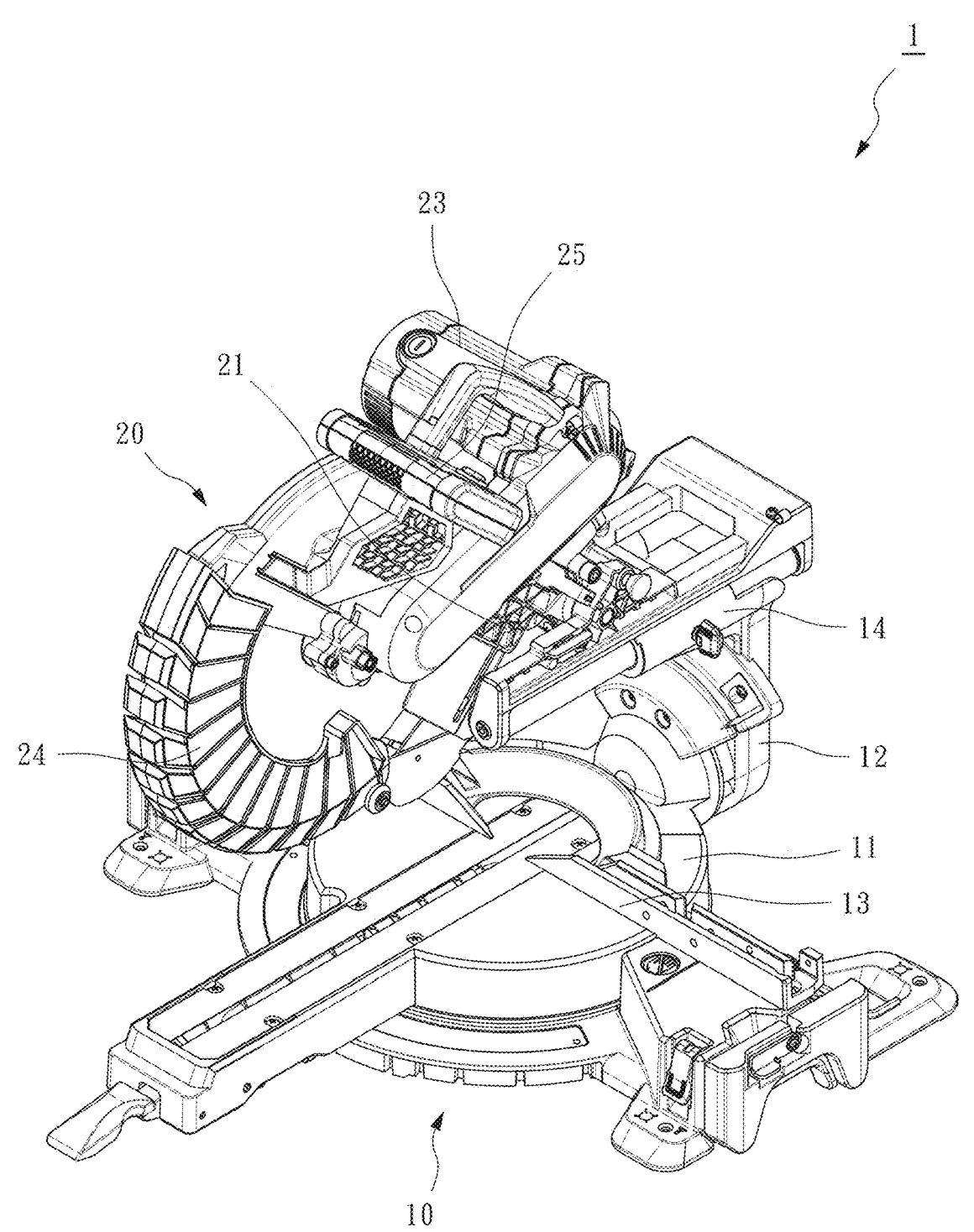
FIG. 1 is a perspective view of a sawing machine according to an embodiment of the present invention.
Figure 2:
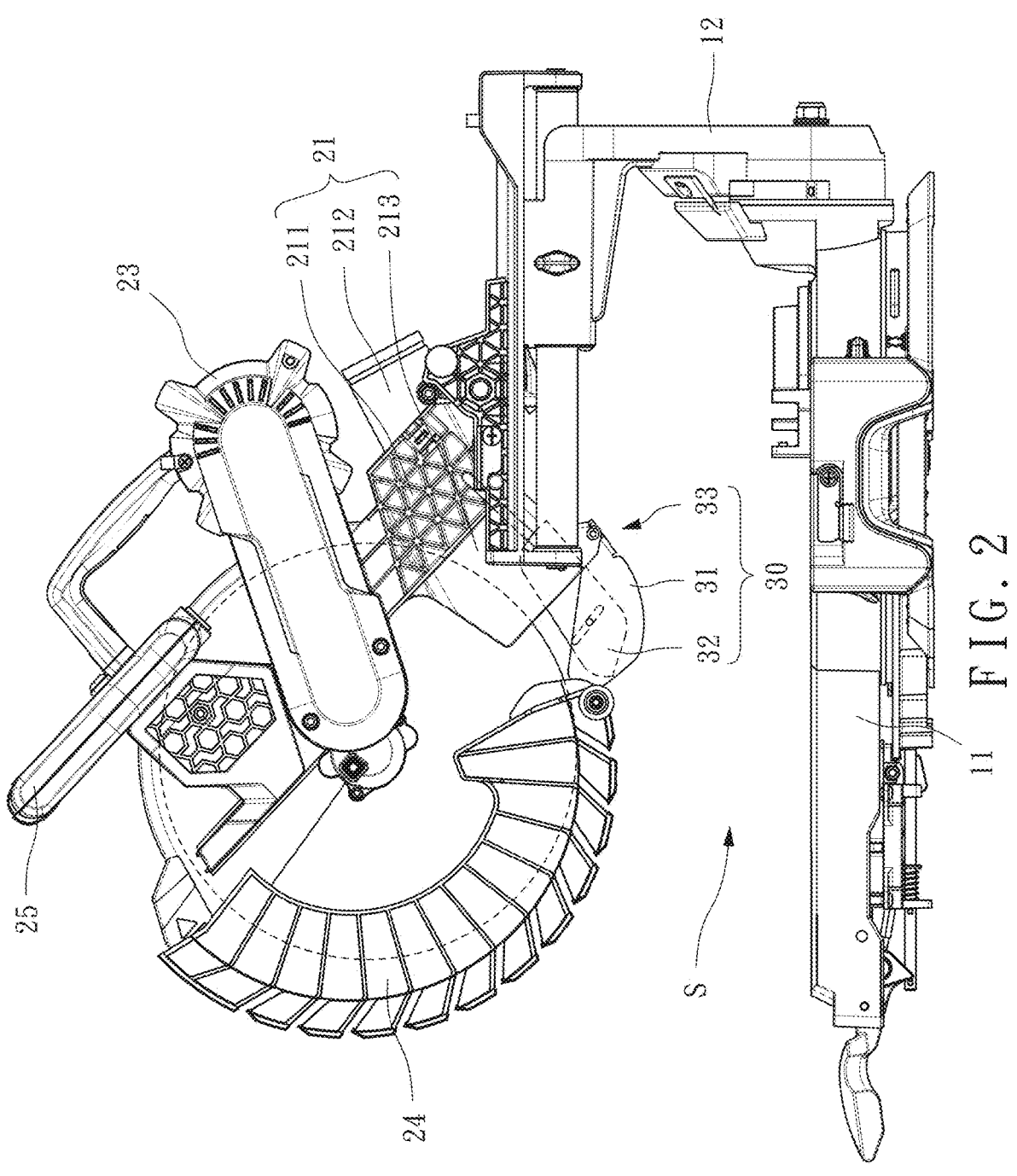
FIG. 2 is a lateral view of FIG. 1.

The technical content and features of the present invention will be described in detail in conjunction with the drawings through one or more embodiments described below. The directional descriptive terms such as "up, down, inner, outer, top, and bottom" mentioned in the specification are merely exemplary descriptive terms based on normal usage directions and are not intended to limit the scope of the claims.

Furthermore, singular quantity terms such as "one, a, and the" used in the claims of the present invention encompass the meanings of multiple. Therefore, for example, the description of "a member" refers to one or more members, including equivalent substitutions known to those skilled in the art. All conjunctions used in similar situations should also be understood in the broadest sense, and specific shapes, structural features, or technical terms described in the specification should also be understood to include equivalent substitute structures or technical terms that can achieve the same functions.

In order to detailedly illustrate the technical features of the present invention, the following embodiments are provided and described with reference numerals denoted in the drawings.

As shown in FIGS. 1 to 4, a sawing machine 1 provided by an embodiment of the present invention is used to saw a workpiece W. The sawing machine 1 includes a base assembly 10, a sawing assembly 20, and a chip collection assembly 30. In this embodiment, the sawing machine 1 is exemplified as a circular saw machine.

The base assembly 10 includes a worktable 11, a post 12 and a sawing space S defined between the top surface of the worktable 11 and the front side of the post 12. Typically, the worktable 11 can be controlled to rotate in place, allowing sawing of the workpiece W placed on the top surface of the worktable 11 at different angles. Additionally, a set of fences 13 is provided on the worktable 11. The post 12 is connected to the rear side of the worktable 11, and a set of slide rail devices 14 is provided on the top side of the post 12 to allow the sawing assembly 20 to move back and forth.

Figure 3:
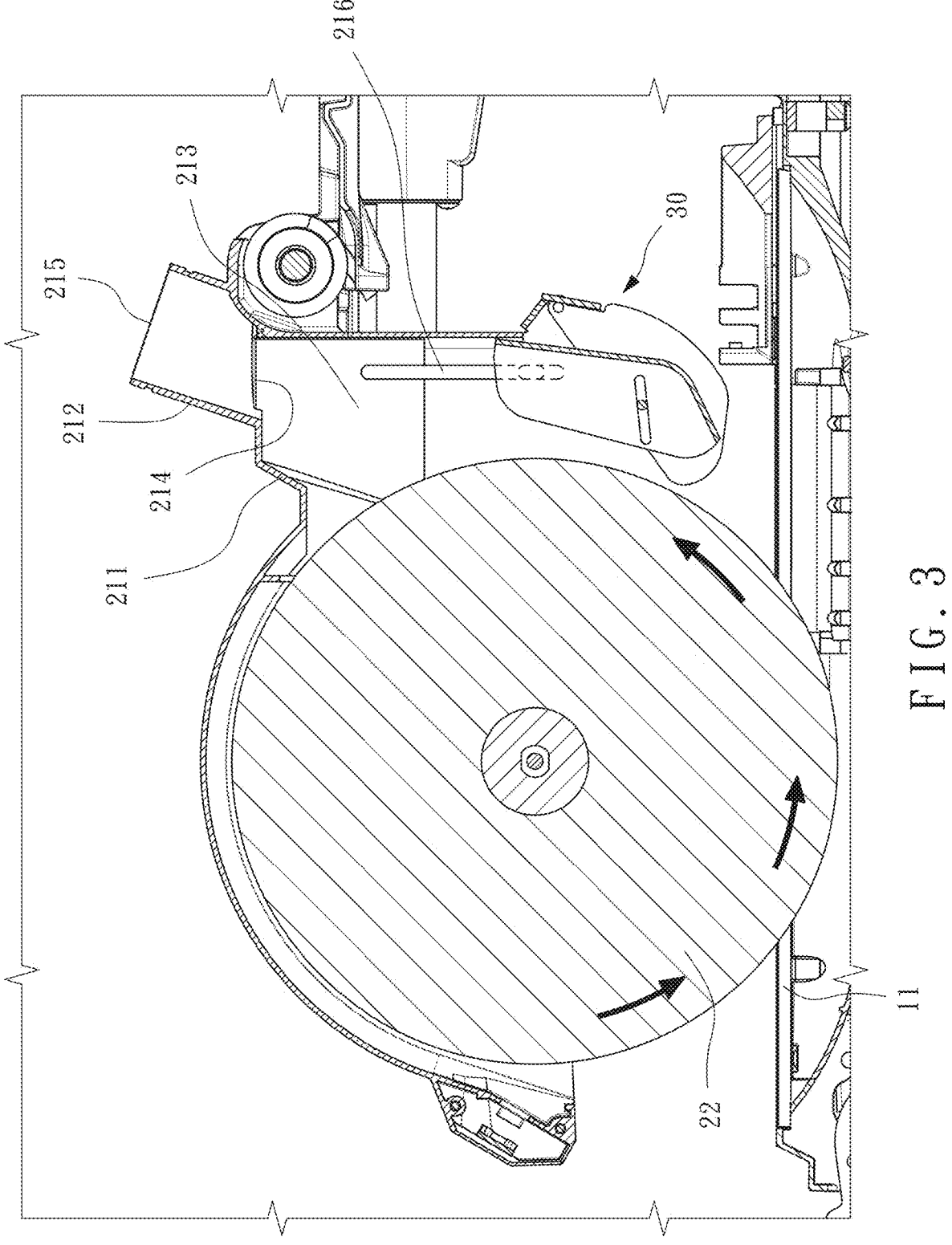
FIG. 3 is a partial sectional view of FIG. 1.
Figure 4:
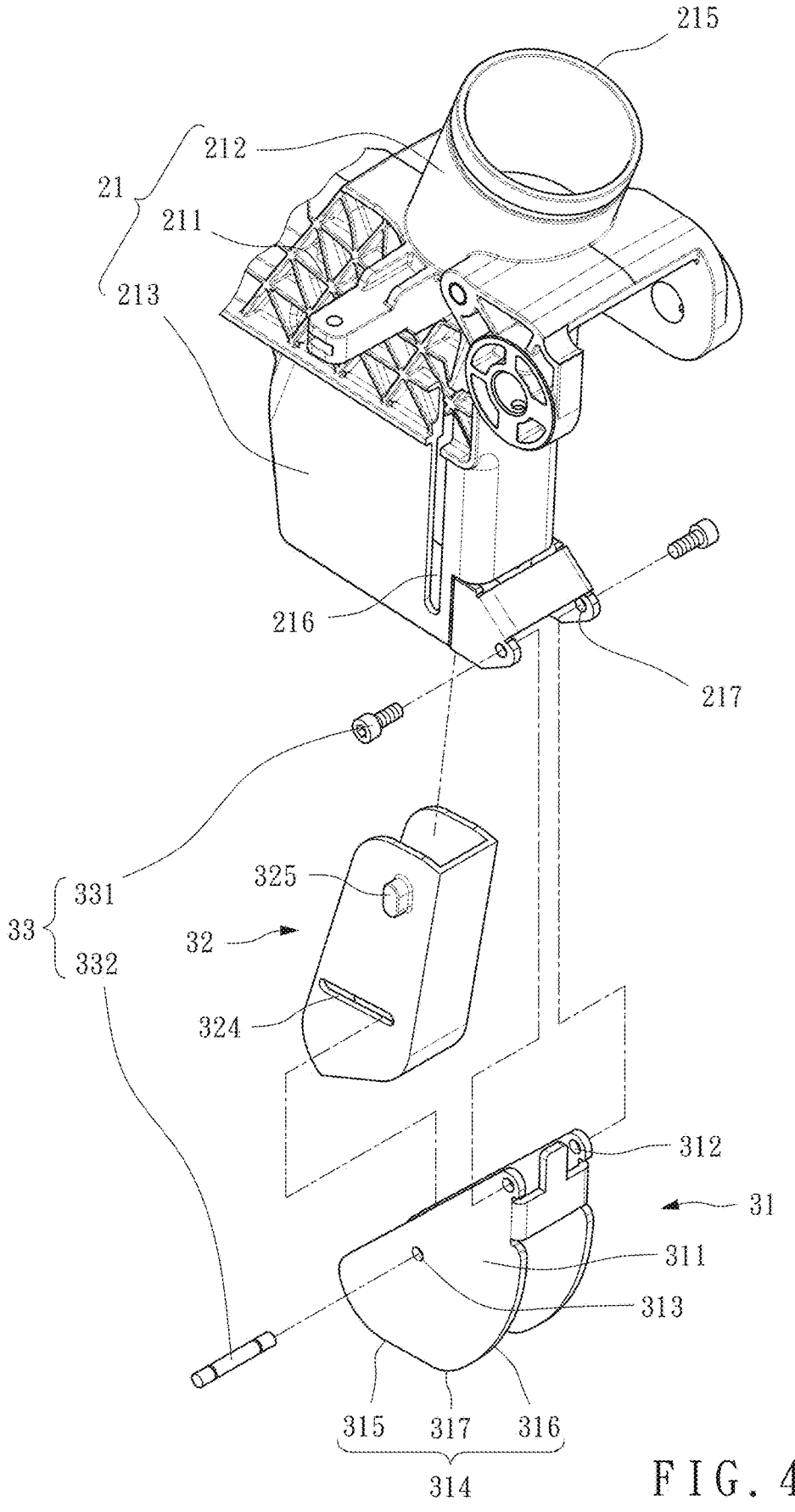
FIG. 4 is an exploded view of a part of the sawing machine shown in FIG. 1.
Figure 5:
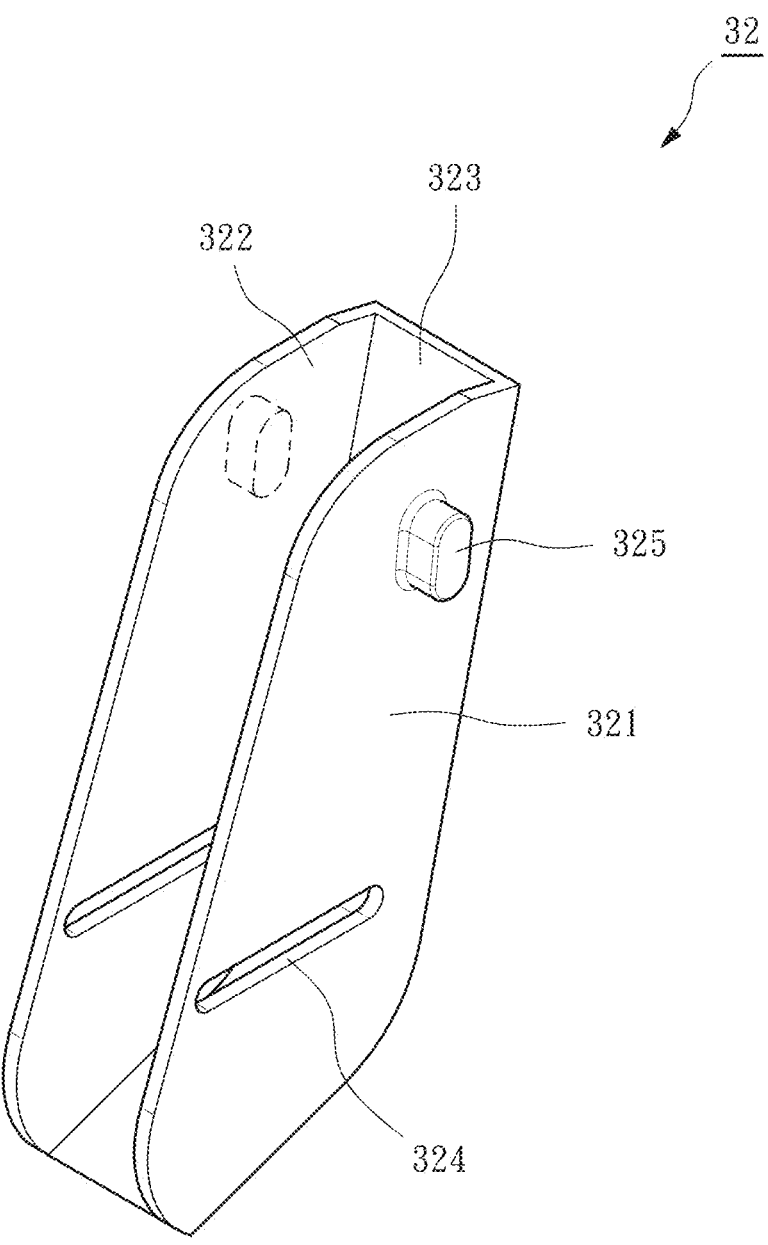
FIG. 5 is an enlarged perspective view of the chip guiding member according to the embodiment of the present invention.

The sawing assembly 20 includes a rocker arm 21, a saw blade 22, and a driving device 23. The rocker arm 21 is pivotally connected with the slide rail device set 14 of the base assembly 10, thereby allowing the rocker arm 21 to move back and forth and to be swingable towards the sawing space S. As shown in FIGS. 3 and 4, the rocker arm 21 has a rocker arm body 211, a chip collection tube 212, and a set of guide plates 213. The rocker arm body 211 is hollow, and the chip collection tube 212 and the guide plate set 213 are integrally connected to the upper and lower sides of the rocker arm body 211, respectively. The guide plate set 213 has a plurality of guide plates spacedly arranged with respect to each other. The chip collection tube 212 has an inlet 214 and an outlet 215 (see FIG. 3), which are arranged in a way that the chip collection tube 212 is communicated with the interior of the rocker arm body 211 via its inlet 214, and the interior of the guide plate set 213 is also communicated with the interior of the rocker arm body 211. The chip collection tube 212 is communicated with the sawing space S via its inlet 214, the interior of the rocker arm body 211, and the interior of the guide plate set 213, and the chip collection tube 212 is communicated with an outside of the sawing machine 1 via its outlet 215. The outlet 215 of the chip collection tube 212 is used to be connected to a chip collection bag or a vacuum cleaner (not shown). The guide plate set 213 has a set of vertical grooves 216 and a set of pivot tabs 217. The saw blade 22 is rotatably mounted on the front side of the rocker arm body 211, and the driving device 23, which is realized as a motor in this embodiment, is mounted on the rocker arm body 211 and is used to drive the saw blade 22 to rotate, for example, by a belt (not shown), and to drive the bottom of the saw blade 22 to rotate in a direction from front to back. In addition, the sawing assembly 20 typically includes a set of blade guards 24 and a handle 25.

Referring to FIGS. 4 to 7, the chip collection assembly 30 comprises a workpiece position detecting member 31, a chip guiding member 32, and a set of connecting rods 33. The workpiece position detecting member 31 is used to detect the position of the top surface of the workpiece W and can be moved by the push or abutment of the workpiece W. The workpiece position detecting member 31 structurally includes a connected set of lamellar structures 311, and a set of pivot holes 312 and a set of through holes 313 arranged in the lamellar structures 311. The set of lamellar structures 311 is movably located on the outside of the chip guiding member 32 and engaged with the chip guiding member 32. Each lamellar structure 311 has an arc-shaped bottom end 314, comprising a first segment 315 gradually extending upward from the rear to the front, and a second segment 316 connected to the first segment 315 and gradually extending downward from the rear to the front.

The chip guiding member 32 is used to guide the chips to the chip collection tube 212, and the chip guiding member 32 can move along with the movement of the workpiece position detecting member 31 to a position adjacent to the top surface of the workpiece W. The chip guiding member 32 structurally includes a first plate 321, a second plate 322, and a connection plate 323, which are integrally connected in a way that the connection plate 323 is connected with the rear and bottom ends of the first plate 321 and the second plate 322, respectively. The chip guiding member 32 further has a set of inclined grooves 324 and a set of protrusion blocks 325, which are arranged in a way that the protrusion blocks 325 are located above the inclined grooves 324 and within the vertical grooves 216 of the workpiece position detecting member 31, allowing the chip guiding member 32 to move vertically relative to the set of guide plates 213. The chip guiding member 32 communicates with the interior of the set of guide plates 213 and the inlet 214 of the chip collection tube 212, and the bottom end of the chip guiding member 32 is adjacent to (or even the same as) the junction 317 between the first segment 314 and the second segment 315 of the aforementioned arc-shaped bottom end 313.

The workpiece position detecting member 31 and the chip guiding member 32 are movably connected to the rocker arm 21 by the set of connecting rods 33. Specifically, the set of connecting rods 33 comprises two first rods 331 and one second rod 332. The two first rods 331 are realized as two screws in this embodiment. The two first rods 331 are inserted into the pivot holes 311 of the workpiece position detecting member 31 and the pivot tabs 217 of the guide plate 213, allowing the workpiece position detecting member 31 to pivotally connect to the guide plate 213 via the two first rods 331. The second rod 332 is set in the through hole 312 of the workpiece position detecting member 31 and is located within or penetrated through the inclined grooves 324 of the chip guiding member 32.

Figure 6:
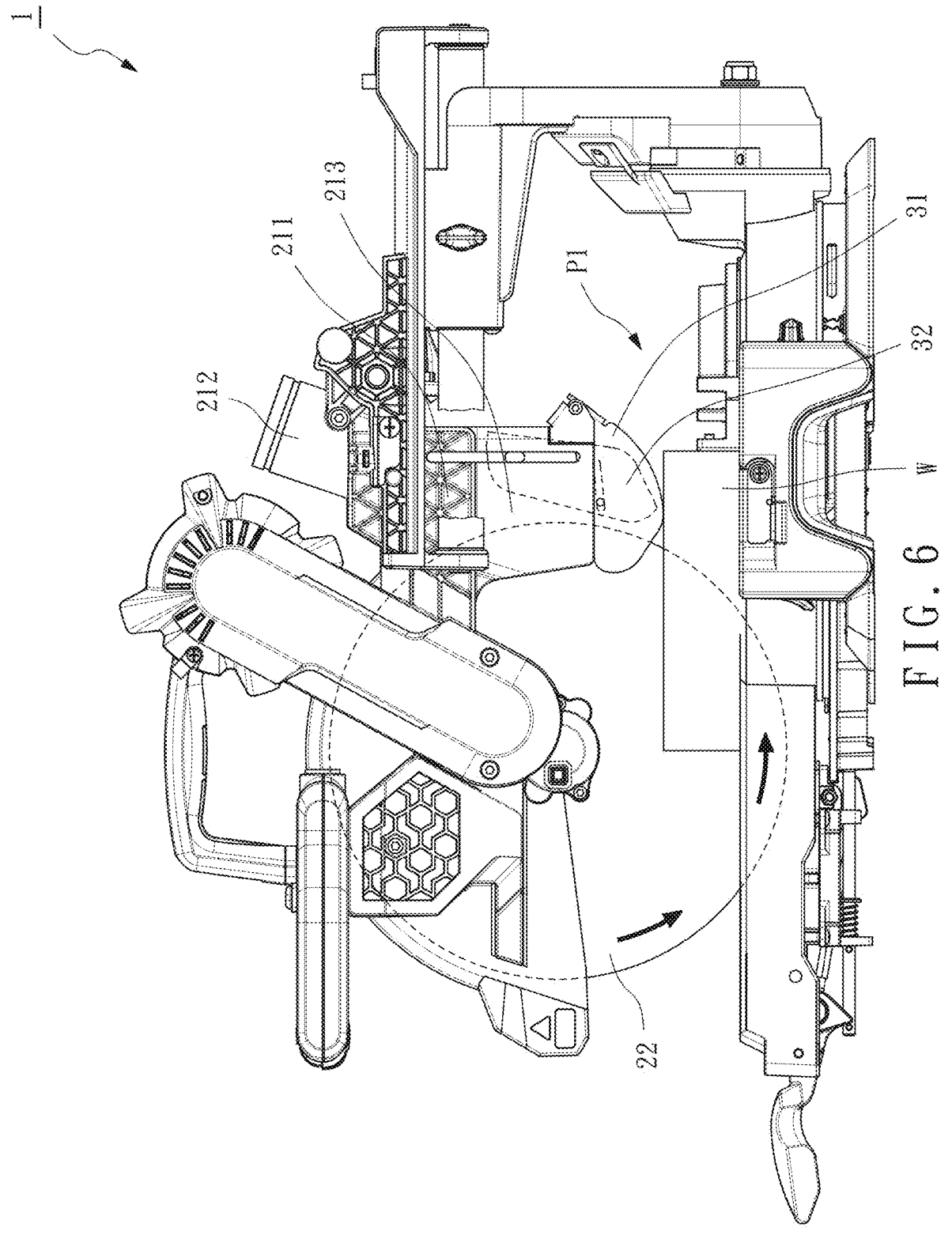
FIG. 6 is an operational schematic view of the chip collection assembly of the sawing machine according to the embodiment of the present invention, illustrating the situation of sawing a thicker workpiece.

With the structural design of the sawing machine 1 in this embodiment, when an operator intends to perform a sawing operation on a thick workpiece W using the sawing machine 1, as shown in FIG. 6, when the workpiece W is placed on the top surface of the worktable 11, the workpiece position detecting member 31 will be pushed and moved by the top surface of the workpiece W, thereby driving the chip guiding member 32 to a thick workpiece position P1 (as shown in FIG. 6). At this time, through the action of the connecting rods 33, the chip guiding member 32 will move upward relative to the set of guide plates 213 (i.e., upward relative to the base assembly 10), and the bottom end of the chip guiding member 32 will be adjacent to or even at the same height as the top surface of the workpiece W. Therefore, during the sawing operation, the chips generated will sequentially pass through the chip guiding member 32, the guide plates 213, the interior of the rocker arm body 211, and the chip collection tube 212 by the airflow generated when the saw blade 22 rotates, and finally be collected by the chip collection bag, avoiding the chips from scattering around the sawing machine 1 or the environment.

Figure 7:
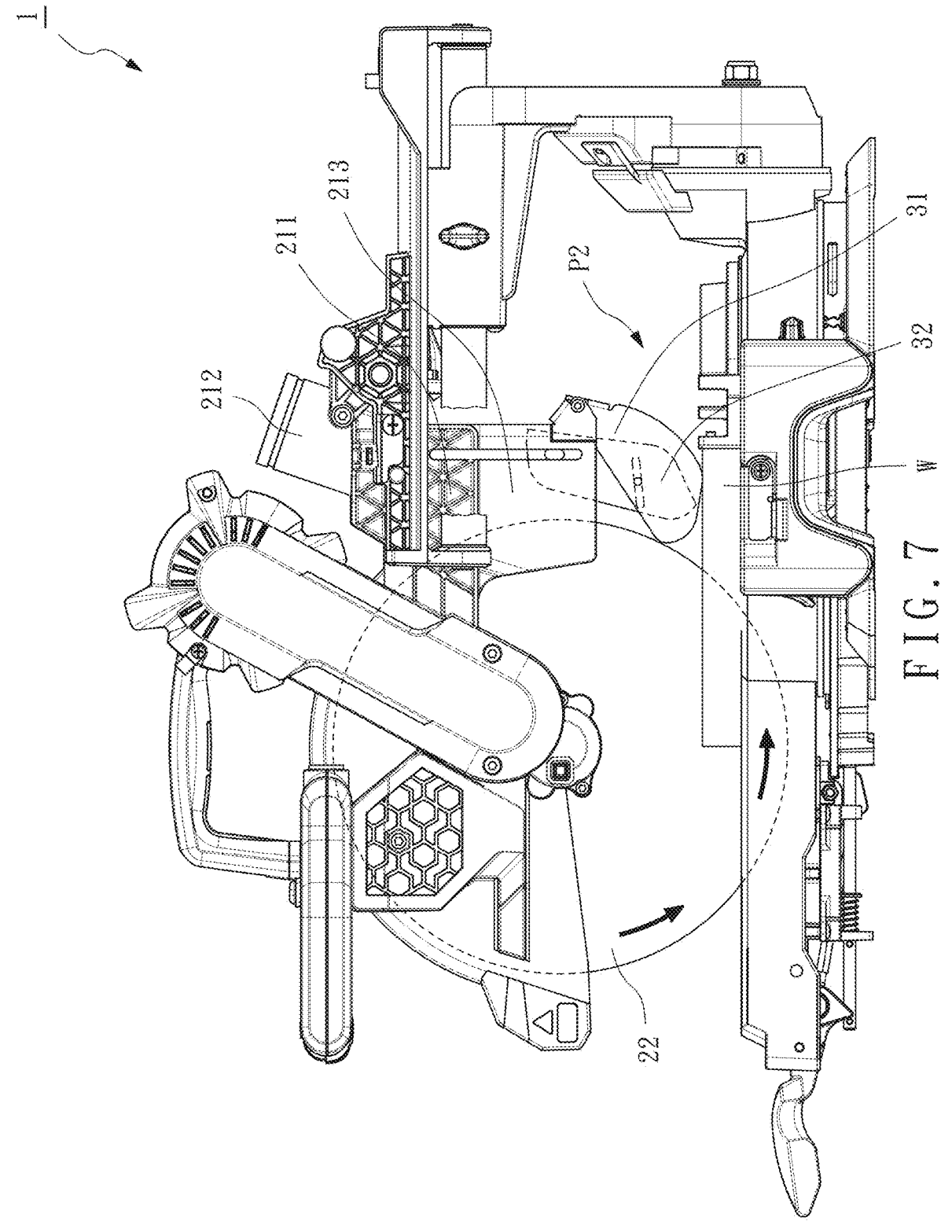
FIG. 7 is similar to FIG. 6, but illustrating the situation of sawing a thinner workpiece.

On the other hand, when an operator intends to saw a thin workpiece W using the sawing machine 1, as shown in FIG. 7, when the workpiece W is placed on the top surface of the worktable 11, the workpiece position detecting member 31 will also be pushed and moved by the top surface of the thinner workpiece W to a different position, thereby driving the chip guiding member 32 to a thin workpiece position P2 (as shown in FIG. 7). At this time, through the action of the connecting rods 33, the chip guiding member 32 will move downward relative to the set of guide plates 213 (i.e., downward relative to the base assembly 10), so that the bottom end of the chip guiding member 32 will still be adjacent to the top surface of the thinner workpiece W (close to the position where the chips are ejected). Therefore, the chips can still be collected by the chip guiding member 32 and finally by the chip collection bag, achieving a better chip collection effect and avoiding chip scattering.

It can be understood that the sawing machine 1 of the present embodiment can guide the chips to the chip collection tube 212 by adjusting the chip guiding member 32 to an appropriate height when sawing workpieces W of different thicknesses. Thus, the sawing machine 1 of the present embodiment can be used for sawing workpieces W of different thicknesses. Additionally, because the height of the chip guiding member 32 of the present embodiment can be automatically adjusted according to the different thicknesses of the workpieces W, there is almost no interference with the workpieces W during use, nor is there a subsequent forced damage due to interference. Furthermore, in the present embodiment, the workpiece position detecting member 31 and the chip guiding member 32 are moved with the cooperation of the connecting rods 33. This allows for more diverse movement trajectories of the chip guiding member 32, rather than just rotating about a single axis, increasing the possibility of the chip guiding member 32 moving to a position suitable for guiding the chips. These are the key points of the present embodiment.

At last, it should be mentioned again that the constituent elements disclosed in the above embodiments of the present invention are only taken as examples for illustration, not intended to limit the scope of the present invention. The substitution or variation of other equivalent elements should be included within the scope of the following claims of the present invention.

What is claimed is:

1. A sawing machine for sawing a workpiece, the sawing machine comprising:

a base assembly including a worktable, a post connected with the worktable, and a sawing space defined between a top surface of the worktable and a front side of the post;

a sawing assembly including a rocker arm pivotally connected with the base assembly and swingable towards the sawing space, a saw blade rotatably disposed with the rocker arm, and a driving device disposed with the rocker arm to drive the saw blade to rotate, wherein the rocker arm includes a chip collection tube having an inlet and an outlet arranged in a way that the chip collection tube is in communication with the sawing space through the inlet and with an exterior of the sawing machine through the outlet; and a chip collection assembly including a workpiece position detecting member, a chip guiding member, and a connecting rod set, wherein the workpiece position detecting member and the chip guiding member are movably connected with the rocker arm by the connecting rod set in a way that the workpiece position detecting member is moveable by the workpiece, and the chip guiding member is in communication with the inlet of the chip collection tube and moveable along with a movement of the workpiece position detecting member to a position adjacent to a top surface of the workpiece;

wherein the chip guiding member is movable upwardly or downwardly relative to the base assembly between a thick workpiece position and a thin workpiece position in accordance with the thickness of the workpiece;

wherein the rocker arm further comprises a guide plate set including a plurality of guide plates spaced from each other; the guide plate set is in communication with the inlet of the chip collection tube, and the chip guiding member is in communication with the inlet of the chip collection tube through the guide plate set; and

wherein the connecting rod set comprises at least one first rod and a second rod; the workpiece position detecting member is pivotally connected with the guide plate set by the at least one first rod; the guide plate set includes a vertical groove, and the chip guiding member includes an inclined groove and a protrusion block; the second rod is mounted to the workpiece position detecting member and located within the inclined groove of the chip guiding member, and the protrusion block is located within the vertical groove.

2. The sawing machine as claimed in claim 1, wherein the workpiece position detecting member has an arc-shaped bottom end.

3. The sawing machine as claimed in claim 2, wherein the arc-shaped bottom end includes a first segment and a second segment connected with the first segment; the first segment gradually extends upward from a rear toward a front thereof, and the second segment gradually extends downward from a rear toward a front thereof; the arc-shaped bottom end of the chip guiding member is adjacent to a junction between the first segment and the second segment.

* * * * *